(12) United States Patent  
Brunswig et al.

(10) Patent No.: US 7,702,650 B2
(45) Date of Patent: Apr. 20, 2010

(54) ADAPTIVE MODELS FRAMEWORK

(75) Inventors: Frank Brunswig, Heidelberg (DE); Ariane Buster, Livesheim (DE); Hilmar Demant, Karlsdorf (DE); Jan Heiler, Walldorf (DE); Uwe Klinger, Bad Schoenborn (DE); Ruediger Kretschmer, Bruchsal (DE); Stefanie Mayer, Deilheim-Horrenberg (DE); Brian McKellar, Heidelberg (DE); Guenter Pecht-Seibert, Muehlhausen (DE); Bare Said, St. Leon-Rot (DE)

(73) Assignee: SAP AG, Walldorf (DE)

( * ) Notice: Subject to any disclaimer, the term of this patent is extended or adjusted under 35 U.S.C. 154(b) by 389 days.

(21) Appl. No.: 11/646,400

(22) Filed: Dec. 28, 2006

(65) Prior Publication Data

US 2008/0162095 A1 Jul. 3, 2008

(51) Int. Cl.
*G06F 17/30* (2006.01)

(52) U.S. Cl. .............................. 707/103 R; 707/103 Y; 707/103 Z; 719/316

(58) Field of Classification Search .. 707/103 R–103 Z; 719/328, 316; 717/101
See application file for complete search history.

(56) References Cited

U.S. PATENT DOCUMENTS

| | | | |
|---|---|---|---|
| 2004/0187140 A1* | 9/2004 | Aigner et al. | 719/328 |
| 2005/0005259 A1* | 1/2005 | Avery et al. | 717/103 |
| 2005/0027559 A1* | 2/2005 | Rajan et al. | 705/1 |
| 2007/0011299 A1* | 1/2007 | Farkas et al. | 709/224 |
| 2007/0033088 A1* | 2/2007 | Aigner et al. | 705/9 |
| 2008/0098036 A1* | 4/2008 | Riemann et al. | 707/104.1 |

* cited by examiner

*Primary Examiner*—Debbie Le
(74) *Attorney, Agent, or Firm*—Finnegan, Henderson, Farabow, Garrett & Dunner, LLP

(57) ABSTRACT

A system for extending a business object used in a user interface. The system includes a service layer comprising the business object. The system also includes a models framework comprising a meta model including business data of the business object, wherein the meta model is extended for use in the user interface. The system further includes a processing engine for generating the user interface, wherein the processing engine provides a platform for extending the meta model for use in the user interface.

14 Claims, 5 Drawing Sheets

ADAPTIVE MODELS FRAMEWORK

DESCRIPTION OF THE INVENTION

1. Field of the Invention

The present invention relates generally to an enterprise application. More particularly, the present invention relates to an enterprise application having an adaptive models framework.

2. Background of the Invention

There is, and will continue to be, advances and changes in how enterprises conduct business. Whether these advances and changes occur through growing competition and globalization, mergers and acquisitions, or revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, may represent a self-contained, self-describing piece of application functionality that can be found and accessed by other applications. A service may be self-contained because the application using the service does not have to depend on anything other than the service itself, and may be self-describing because all the information on how to use the service can be obtained from the service itself. The descriptions may be centrally stored and accessible through standard mechanisms.

Instead of requiring programmers to establish and maintain links between applications, services may be loosely coupled, making connections simpler and more flexible, and allowing application architects to more easily find and understand services offered by other cooperative applications. However, a problem that exists with services is that they are often designed to expose functionality of individual applications and, thus, may be too limited to be efficient building blocks for enterprise-wide business processes. A solution to this shortfall has been the migration to a Service Oriented Architecture (SOA). The SOA may use an open architecture middleware, which builds on the benefits of services. An example of an SOA can be found in the Enterprise Services Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model).

An SOA may enable the abstraction of business objects, modeled as services (also referred to as enterprise services), from actual applications. Aggregating services into business-level enterprise services may provide more meaningful building blocks for the task of automating enterprise-scale business scenarios. Enterprise services allow IT organizations to efficiently develop composite applications e.g., applications that compose functionality and information from existing systems to support new business processes or scenarios.

An SOA may also enable the use of an enterprise services repository. The enterprise services repository may store relevant preexisting enterprise services and may make them available for use by, for example, selected partners and customers. By using the enterprise services repository, these selected partners and customers can use the preexisting enterprise services to facilitate the implementation of new services and corresponding business objects. The term business object (BO) represents a physical or logical object that may be significant to a business, such as a purchase order. An "object" generally refers to a software bundle of variables (e.g., data) and related methods. For example, in object-oriented programming, an object may be a concrete realization (instance) of a class that consists of data and the operations associated with that data. An example of a business object is a purchase order business object having data and related methods. When a purchase order business object is instantiated, a user may interact with the purchase order by, for example, providing data for fields in the purchase order.

As well known in the art, a business object may be extended to define the object more narrowly and thus support additional features that may have business significance. For example, an employee object, which is an instantiation of an employee class, may consist of basic data that may be common to all employees and the operations associated with that data. The basic data may include an employee ID, a base salary, a start date, and so forth. In order to support a subclass of an employee, such as a manager, the employee object may be extended to introduce a more narrowly defined business object, such as a manager object. By extending the employee object, the manager object may inherit data that may be common to all employees, such as an employee ID, a base salary, a start date, and so forth. Moreover, additional data that may be pertaining only to a manager may be added to the manager object. Additional operations associated with the additional data may also be introduced into the manager object. Similarly, the manager object may further be extended to introduce an even more narrowly defined business object, such as an executive manager object. The flexibility of object-oriented programming based on object extension and inheritance may be essential in capturing real world scenarios.

Enterprise services based on business objects, however, face limitations when the services are used in user interface scenarios. In particular, user interface related features, such as success or error messages, copy or paste, and save or load draft, have no business significance. User interface scenarios may thus not be conveniently represented as, or supported by, enterprise services without impacting the design of the underlying business objects.

Moreover, because business objects are physical or logical objects that may be significant to a business, business objects are typically normalized. Thus, information needed for a user interface scenario may need to be fetched from many different business objects. Also, business objects may not be flexible enough to be used in one or more user interface scenarios. For example, although business objects may be extended to support additional functionality that has business significance, they may not be extended conveniently to support additional functionality for a particular user interface. The extending business objects may be limited to define real world scenarios.

In the view of the foregoing, there is a need for systems and methods that allow enterprise services and business objects to be more conveniently used in user interface scenarios. Further, there is a need for systems and methods that allow enterprise services and business objects to be extended in an adaptive way.

SUMMARY OF THE INVENTION

Consistent with embodiments of the invention, a system for extending a business object used in a user interface is provided. The system includes a service layer comprising the business object. The system also includes a models framework comprising a meta model including business data of the business object, wherein the meta model is extended for use in the user interface. The system further includes an engine for generating the user interface, wherein the pattern engine provides a platform for extending the meta model.

In another embodiment, a method for extending a business object used in a user interface is provided. The method includes implementing a models framework comprising a meta model including business data of the business object, wherein the meta model is extended for use in the user interface. The method also includes implementing a platform for extending the meta model for use in the user interface. The method further includes generating the user interface based on the meta model.

In yet another embodiment, a computer-readable medium including instructions to configure a computer to implement a method for extending a business object used in a user interface is provided. The computer-readable medium includes instructions for implementing a models framework comprising a meta model including business data of the business object, wherein the meta model is extended for use in the user interface. The computer-readable medium also includes instructions for implementing a platform for extending the meta model for use in the user interface. The computer-readable medium further includes instructions for generating the user interface based on the meta model.

It is to be understood that both the foregoing general description and the following detailed description are exemplary and explanatory only, and should not be considered restrictive of the scope of the invention, as claimed. Further features and/or variations may be provided in addition to those set forth herein. For example, embodiments consistent with the present invention may be directed to various combinations and subcombinations of the features described in the following detailed description.

BRIEF DESCRIPTION OF THE DRAWINGS

The accompanying drawings, which are incorporated in and constitute a part of this specification, illustrate various embodiments and aspects of the present invention. In the drawings.

DETAILED DESCRIPTION

Reference will now be made in detail to the invention, examples of which are illustrated in the accompanying drawings. Implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
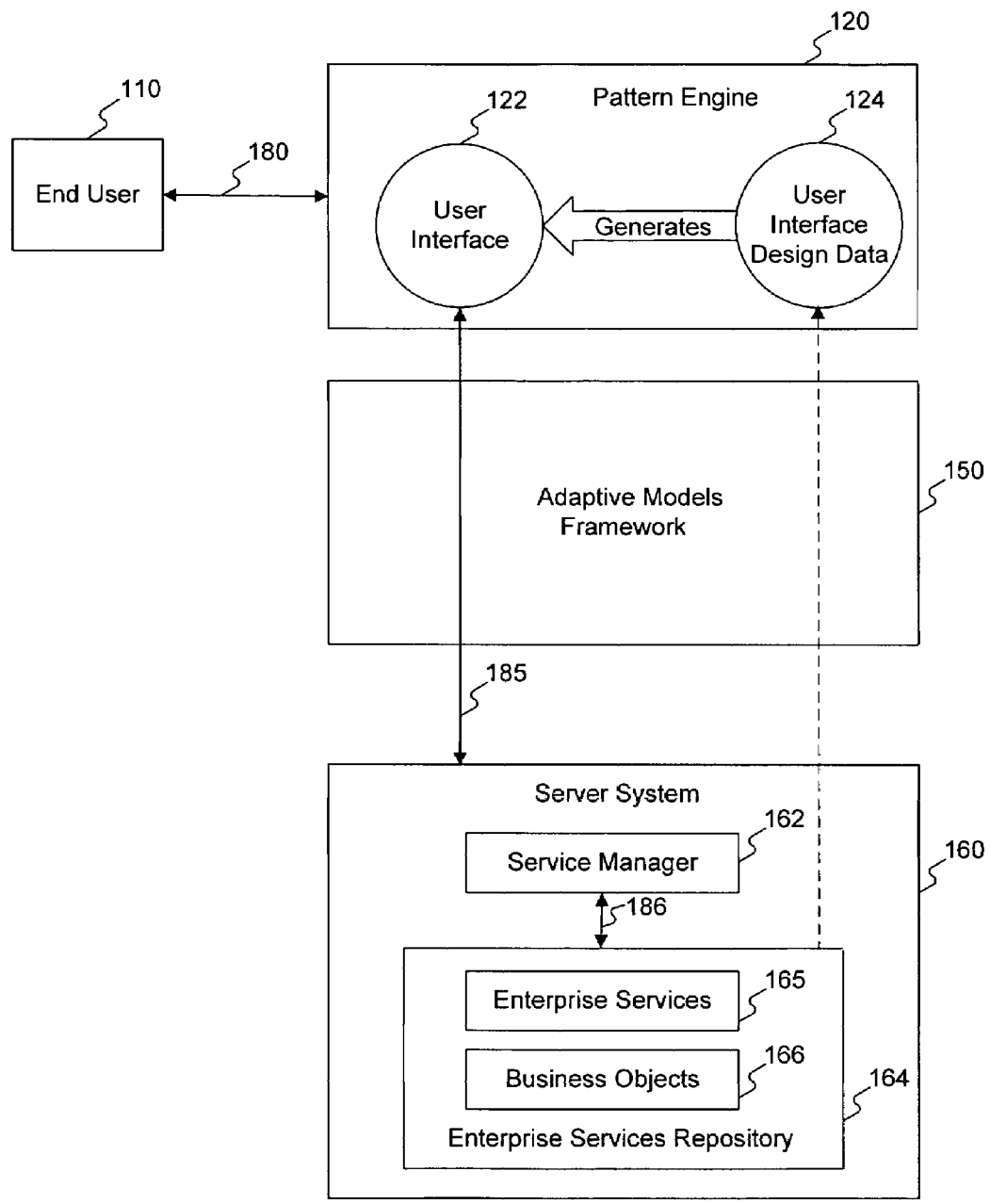
FIG. 1 is a block diagram illustrating an adaptive models framework in an exemplary enterprise system consistent with the present invention.

FIG. 1 is a block diagram illustrating an exemplary enterprise system 100 consistent with the present invention. As shown in FIG. 1, system 100 may include an end user 110, a pattern engine 120, an adaptive models framework 150, and a server system 160. End user 110 may include one or more processors, such as computers, to interface with other computers, such as pattern engine 120. End user 110 may include a browser to provide content, such as a user interface 122, from pattern engine 120. Although FIG. 1 depicts only one end user 110, pattern engine 120, adaptive models framework 150, and server system 160, system 100 may include any number of these components. In addition, the entities depicted in FIG. 1 may be distributed among multiple locations and/or located at a single location.

Pattern engine 120 may include one or more processors, such as computers, to interface with other computers, such as end user 110, adaptive models framework 150, and server system 160. In one embodiment, pattern engine 120 may be an Abap Pattern Engine, which is commercially available from SAP AG, Walldorf, Germany, and may run on an Abap server, which is also commercially available from SAP AG, Walldorf, Germany. Pattern engine 120 may connect to end user 110 and server system 160 through network connections 180 and 185, respectively. Pattern engine 120 may generate a user interface 122 based on user interface design data 124, and present user interface 122 to end user 110. As described in more detail below, user interface 122 of pattern engine 120 may provide an interface allowing end user 110 to interact with server system 160.

User interface data 124 may be based on meta entities of adaptive models framework 150, as described in more detail below with respect to FIG. 2. User interface data 124 may include composition and configuration data, which are described in more detail below with respect to FIG. 4. Adaptive models framework 150 may be an architectural layer between pattern engine 120 and enterprise services 165 or business objects 166 of server system 160, and thus may not represent a physical machine. To this end, meta entities of adaptive models framework 150 may assist enterprise services 165 and business objects 166 to be extended adaptively and used more conveniently in creation of user interface design data 124, as described in more detailed with respect to FIG. 5.

Server system 160 may include one or more processors, such as computers, to interface with other computers, such as pattern engine 120. Server system 160 may be implemented as or as part of an SOA. In one embodiment, server system 160 may be implemented as an Enterprise Services Framework (ESF). However, while system 100 may be described as implemented in an ESF, systems consistent with the invention may be implemented in other types of environments. Server system 160 may run on a server, such as an Abap server, supporting an SOA. As shown in FIG. 1, server system 160 may further include a service manager 162 and an enterprise services repository 164 that may contain enterprise services 165 and business objects 166. User interface 122 may call service manager 162 for a service request. Service manager 162 may use enterprise services 165 based on business objects 166 in response to the service request received from user interface 122.

Enterprise services repository 164 may be implemented as a storage device for storing information associated with enterprise services 165 and business object 166. Enterprise services 165 may include one or more enterprise services, which, as described above, may represent a self-contained, self-describing piece of application functionality that can be found and accessed by other applications. Enterprise services 165 may be based on one or more business objects 166.

In one embodiment, enterprise services repository 160 may also store information associated with meta entities of adaptive models framework 150 in a base form, which as known in the art, may be a form before the meta entities may have been used to support enterprise services 165 and business objects 166. After the meta entities of adaptive models framework 150 may have been used to extend enterprise services 165 and business objects 166 for user interface scenarios, the meta entities of adaptive models framework 150 may be stored as part of user interface design data 124 in a runtime repository of pattern engine 120. The meta entities of adaptive models framework 150 are described in more detail below with respect to FIG. 4.

Network connections 180, 185, and 186 may be any type of communications mechanism and may include, alone or in any suitable combination, a telephony-based network, a local area network (LAN), a wide area network (WAN), a dedicated Intranet, wireless LAN, the Internet, an Intranet, a wireless network, a bus, or any other communication mechanisms. Further, any suitable combination of wired and/or wireless components and systems may provide network connections 180, 185, and 186. Moreover, network connections 180, 185, and 186 may be embodied using bidirectional, unidirectional, or dedicated communication links. Network connections 180, 185, and 186 may also implement standard transmission protocols, such as Transmission Control Protocol/Internet Protocol (TCP/IP), Hyper Text Transfer Protocol (HTTP), Simple Object Access Protocol (SOAP), Remote Procedure Calls (RPC), or other protocols.

Figure 2:
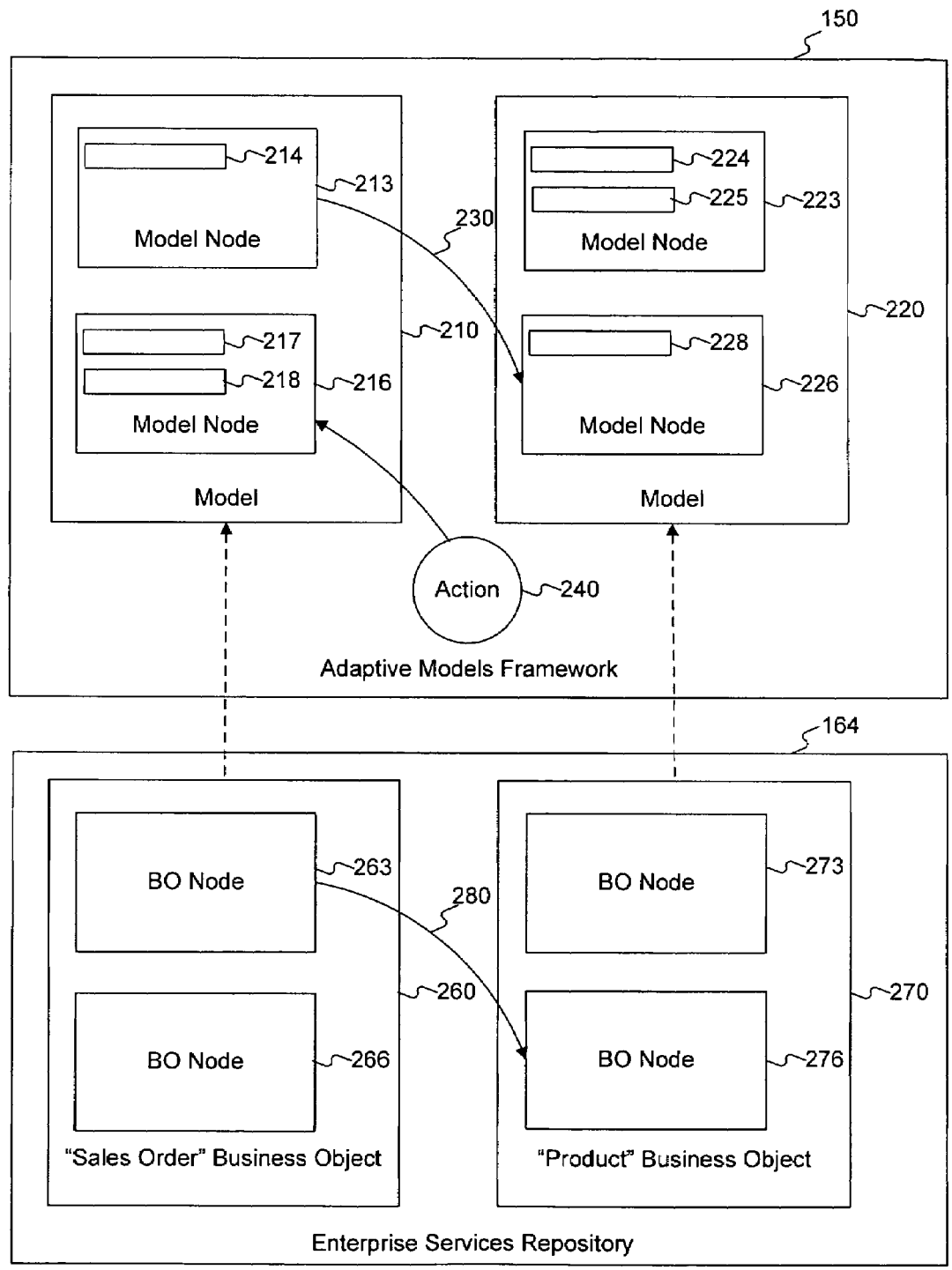
FIG. 2 is a block diagram further illustrating an exemplary adaptive models framework consistent with the present invention.

FIG. 2 is a further illustration of an exemplary adaptive models framework 150 consistent with the present invention. As shown, adaptive models framework 150 may include, for example, models 210 and 220. Models 210 and 220 may correspond to business objects 260 and 270, which may be another embodiment of business objects 166. Models 210 and 220 may be the abstractions of real-world business objects. For example, model 210 may be the abstraction of a sales order business object 260 and may contain reduced content of the business data of business object 260. Similarly, model 220 may be the abstraction of a product business object 270 and may contain reduced content of the business data of business object 270. Models 210 and 220 may thus contain all the necessary business data for user interface without the complexity of business objects 260 and 270. To this extent, models 210 and 220 may not be subject to architectural constraints imposed on business objects 260 and 270. Therefore, extending models 210 and 220 may not be limited to further defining the models based on real world scenarios.

In addition, models 210 and 220 may be meta models. A meta model may be a type of a meta data model, a meta process model, a transformation model, or any combination of these models. A meta data model may include additional information about the data that the model may contain, a meta process model may include additional information about the processes or methods that the model may support, and a transformation model may include additional information about the transformations of data that the model may support. In one exemplary embodiment, models 210 and 220 may be meta data models, and may contain additional information about the business data that models 210 and 220 may contain, which may be reduced content of the business data of business objects 260 and 270, respectively. With this approach, models 210 and 220 may be used to express additional semantics of already existing business data of business objects 260 and 270 without impacting the design of business objects 260 and 270.

As shown in FIG. 2, model 210 may include model nodes 213 and 216. Model nodes 213 and 216 may provide access to the business data of model 210. For example, model nodes 213 and 216 may be sales item model nodes that may provide access to sales item data of model 210. Similarly, model 220 may include model nodes 223 and 226, and model nodes 223 and 226 may provide access to the business data of model 220. For example, model nodes 223 and 226 may be product item model nodes that may provide access to product item data of model 220. Model nodes 213, 216, 223, and 226 may include one or more data record. For example, model node 213 may have a data record 214, and model node 216 may have data records 217 and 218. Similarly, model node 223 may have data records 224 and 225, and model node 226 may have a data record 228. Because these model nodes may be part of models 210 and 220, which may be meta models, model nodes 213, 216, 223, and 226 may contain additional information about the business data. For example, in one exemplary embodiment, each data record in these model nodes may have a unique key identifier that identifies the business data. Using the unique key identifier in these data records, the business data may be retrieved from models 210 and 220 directly without a query. In addition, navigation between model nodes may be enabled with the additional information about the business data. For example, an association 230, which may be an meta entity that may contain additional information about business association 280, may enable navigation between model nodes 213 and 226 with support of the unique key identifier of the data records.

In another exemplary embodiment, the unique key identifier of these data records may be used to map data records between two distinct models 210 and 220. For example, data record 214 may be identified as "RECORD001" and data record 224 may be identified as "RECORD005." Using the key identifiers of data records 214 and 224, two data records may be mapped or linked. For example, any update to data record 214 may update data record 224. Such data mapping information may be stored within meta models 210 and 220 as meta data.

In addition, data binding between a field of user interface 122 and a piece of the business data may be enabled. For example, user interface 122 may be designed so that a specific piece of the business data from business 260 may be displayed in a specific field of user interface 122. Any change to the piece of the business data may be reflected in the field of user interface 122. Similarly, any change made to the field of user interface 122 may require an update to the piece of the business data. To this end, model 210 may include model nodes 213 and 216 to include the business data of business object 260 with any information related to the data binding between the business data and user interface 122. Such data binding information may be stored as meta data within model 210.

Moreover, in yet another exemplary embodiment, the business data of business object 270 may need to be transformed to fit for user interface 122. Any additional information to support such transformation may be stored as meta data within model 210. For example, business object 270 may include a weight of a product in pounds. Model 220 may include model nodes 223 and 226 to include the business data of business object 270 with any information needed to convert the weight of product from pounds to kilograms for user interface 122.

With this approach, model-driven data binding, data mapping, and data transformation, which may not typically be available to business objects 260 and 270, may be provided by the meta entities of adaptive models framework 150 without impacting the underlying design of business objects 260 and 270. Instead of changing the underlying design of the business objects 260 and 270, the business data of the business objects 260 and 270 may be included in models 210 and 220 with any additional information as meta data to give effects of model-drive data binding, data mapping, and data transformation of business objects 260 and 270.

Model nodes may also be associated with other model nodes. For example, as explained above, association 230 depicts that model node 213 may be associated with model node 226. Association 230 may correspond to business object (BO) association 280. Association 230 of adaptive models framework 150, however, may be a meta entity, and may include additional information about BO association 280. Association 230 may have information about a source model node and a target model node. For example, association 230 may have model node 213 as a source model node and model node 226 as a target model node. In addition, association 230 may have an association cardinality, which may describe the relationship between model nodes that participate in association 230. An associate cardinality may be used to enforce a real world business rule. For example, the association cardinality of association 230 may enforce a one to one relationship between model nodes 213 and 226, and may be used to enforce a real world business rule for user interface, such as "every sale item has exactly one product."

As shown in FIG. 2, adaptive model framework 150 may also include an action 240. Action 240 may be a specific user interface operation that may be performed on model node 216. Action 240 may be a meta process model, and may contain additional information about the specific user operation. For example, action 240 may include an action cardinality to define a relationship. Action 240 may include a model node to return the result from the specific user operation. Such model node may be a result model node. Action 240 may be one of several action types. For example, action 240 may be a type of a standard action or a type of a query action.

Figure 3B:
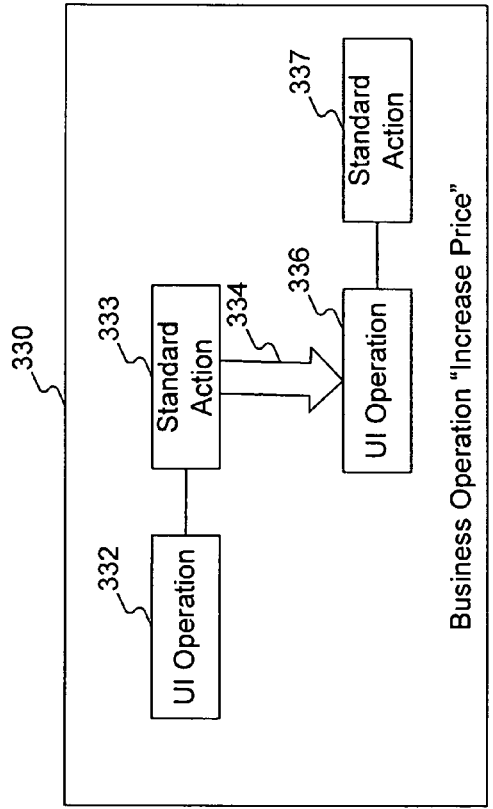
FIG. 3B is a block diagram illustrating an exemplary business operation that requires input parameters consistent with the present invention.
Figure 3D:
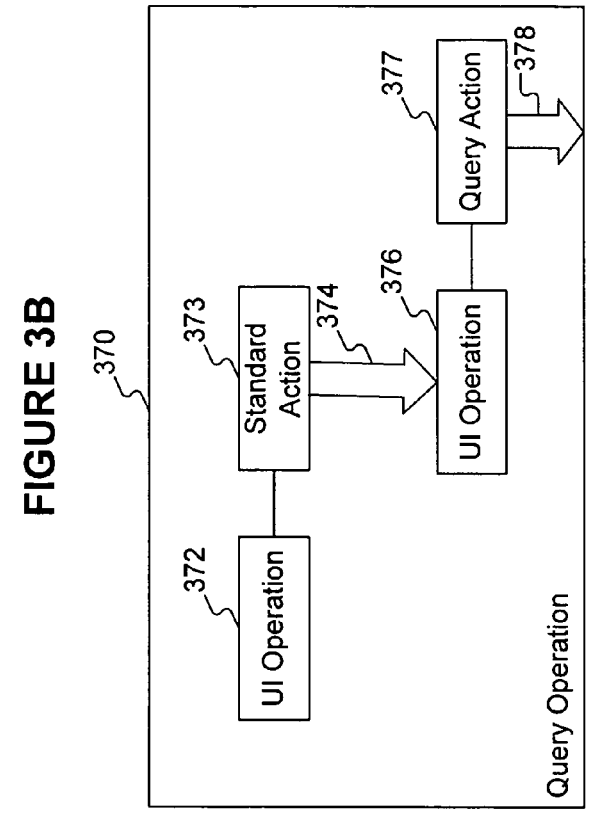
FIG. 3D is a block diagram illustrating an exemplary query operation that requires input parameters consistent with the present invention.
Figure 3A:
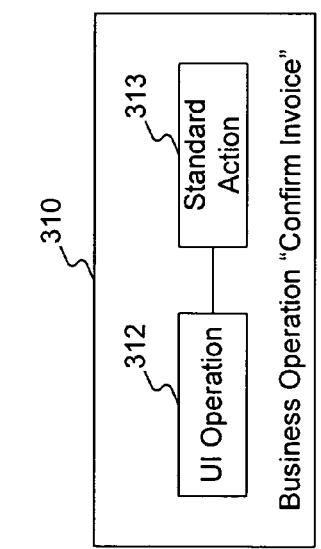
FIG. 3A is a block diagram illustrating an exemplary business operation that requires no input parameter consistent with the present invention.

FIGS. 3A to 3D illustrate user interface operations that may be extended or supported by an adaptive models framework consistent with the present invention. For instance, FIG. 3A is a block diagram illustrating an exemplary business operation 310 that may not require any input parameters. Business operation 310 may be any operation that may have business significance. For example, business operation 310 may be performed to confirm an invoice. In one embodiment, business operation 310 may involve a user interface (UI) operation 312 and its corresponding standard action 313. User interface (UI) operation 312 may be any operation that may require a user action or input. For example, UI operation 312 may display a dialog box asking a user to confirm an invoice. The user may then confirm the invoice by answering positively to the dialog box. Standard action 313 may be a meta entity of adaptive models framework 150, and may include additional information to support UI operation 312. Business operation 310 may not require user input parameters, and thus standard action 313 may not include or require additional information.

FIG. 3B is a block diagram illustrating an exemplary business operation 330 that may require input parameters. For example, business operation 330 may be an increase price operation. In one embodiment, business operation 330 may involve UI operations 332 and 336 and their corresponding standard actions 333 and 337. Business operation 330 may require the percentage with which the price may be increased as an input parameter. To satisfy the requirement, UI operation 332 may display a dialog box asking a user to enter the percentage. The user may then type in the percentage by which the price may be increased. Standard action 333 may be a meta entity of adaptive models framework 150, and may be allowed to include additional information to support UI operation 332. For example, standard action 333 may take the percentage as additional information, and then may return the percentage as a result model node 334. UI operation 336 may take result model node 334 as an input, calculate a new price, and update the price with the newly calculated price. Standard action 337 may not include a result model node because there may be no result returned from UI operation 336. Although FIG. 3A and FIG. 3B illustrate only two ways in which business operations 310 and 330 may be extended or adapted, business operations may be extended or adapted in any other ways with the use of meta entities of adaptive models framework 150.

Figure 3C:
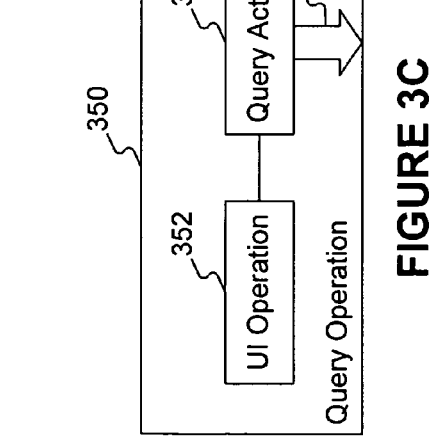
FIG. 3C is a block diagram illustrating an exemplary query operation that requires no input parameter consistent with the present invention.

Similarly, FIG. 3C is a block diagram illustrating an exemplary query operation 350 that may not require any input parameters. Query operation 350 may be any operation that may involve retrieving business data from models, such as models 210 and 220. In one embodiment, query operation 350 may be performed by a UI operation 352 and a query action 353. UI operation 352 may execute the main query of query operation 350, which may return retrieved data. Query action 353 may be a meta entity of adaptive models framework 150, and may be allowed to include additional information to support UI operation 352. For example, standard action 353 may take the retrieved data from the main query and return it as a result model node 354.

FIG. 3D is a block diagram illustrating an exemplary query operation 370 that may require input parameters. In one embodiment, query operation 370 may involve UI operations 372 and 376, a standard action 373, and a query action 377. Query operation 370 may require input parameters that may be necessary for the main query of query operation 370. For example, UI operation 372 may display a dialog box where a user may enter an input parameter. Standard action 373, which may be a meta entity and thus include additional information to support UI operation 372, may take the input parameter and return it as a result model node 374. UI operation 376 may take result model node 374, use the user input as input for the main query of query operation 370, and execute the main query. Query action 377, which may be a meta entity and thus include additional information to support UI operation 376, may take the retrieved data from the main query and return it as a result model node 378. Although FIG. 3C and FIG. 3D illustrate only two ways in which query operations 350 and 370 may be extended or adapted, query operations may be extended or adapted in any other ways with the use of meta entities of adaptive models framework 150.

Figure 4:
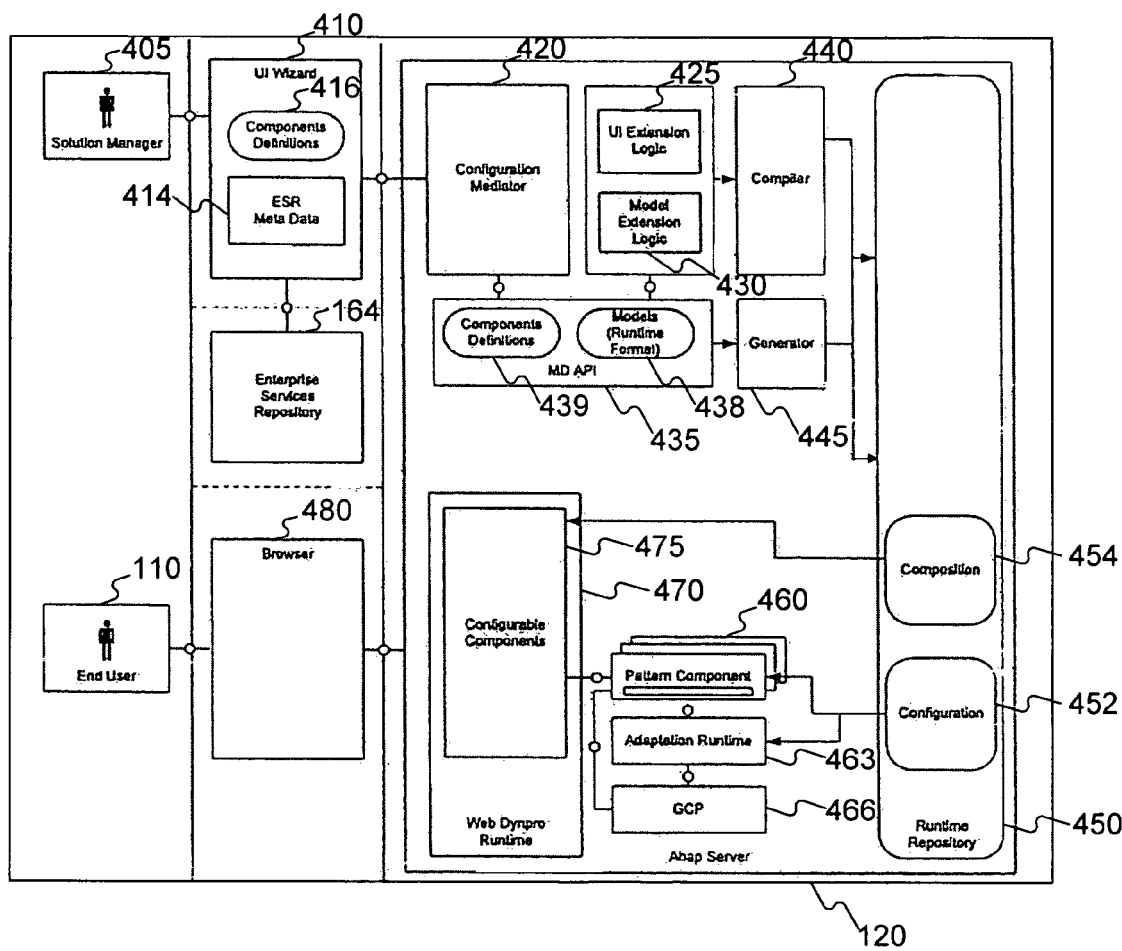
FIG. 4 is a block diagram of an exemplary pattern engine consistent with the present invention.

FIG. 4 is a block diagram of an exemplary implementation of a pattern engine 120 consistent with the present invention. In exemplary embodiments, pattern engine 120 may run on an Abap server, as noted above. As shown in FIG. 4, pattern engine 120 may include configuration mediator 420, a UI extension logic 425, a model extension logic 430, meta-data application programming interface (MD API) 435, a compiler 440, a generator 445, a runtime repository 450, pattern components 460, an adaptation runtime 463, and a generic client proxy (GCP) 466, and a pattern engine runtime 470. MD API 435 may further include models 438 and components definitions 439. Runtime repository 450 may include a configuration 452 and a composition 454. Pattern engine runtime 470 may include configurable components 475.

A solution manager 405 may design a user interface with a UI wizard 410. UI wizard 410 may be a standalone application. In one embodiment, UI Wizard may download enterprise services repository (ESR) meta data 414 from enterprise services repository 164 at a dedicated time. ESR meta data 414 may include meta entities of adaptive models framework 150 in a base form, which as described above with respect to FIG. 1, may be a form before the meta entities may have been used to support enterprise services 165 and business objects 166. Enterprise services repository 164 may be located anywhere or distributed among multiple locations. After the download, no further connection to enterprise services repository 164 may be necessary.

In another embodiment, solution manager 405 may use UI wizard 410 to create his own UI views of business objects 260 and 270 without downloading ESR meta data 414. Solution manager 405 may then use the UI data models to design a complete user interface. ESR meta data 414, which may include meta entities of adaptive framework 150, may then be downloaded for the purpose of mapping the UI views towards their corresponding business objects 260 and 270. Alternatively, without downloading ESR meta data 414, the mapping of the UI views towards their corresponding business objects 260 and 270 may take place within pattern engine 120 after solution manager 405 may provide user interface data from the design to pattern engine 120.

UI wizard 410 may also include components definitions 416. Components definitions 416 may be meta data containing additional information about user interface components and may also include a preview tool to get WYSIWYG support, as well known in the art, in UI wizard 410.

After solution manager 405 may complete user interface design in UI wizard 410, solution manager 405 may provide user interface data from the design to pattern engine 120. Configuration mediator 420 may then extract models 438 and component definitions 439 from the uploaded user interface data. Models 438 may include meta entities, such as models 210 and 220, action 240, and association 230, of adaptive models framework 150. As explained in detail above with respect to FIG. 2, models 438 may include or be allowed to include additional information about the business data of business objects 260 and 270. As explained in detail above with respect to FIGS. 3A to 3D, models 438 may include or be allowed to include additional information to support business operations. To this end, models 438, which may be composed of meta entities of adaptive models framework 150, may be enhanced in an adaptive way by applying model extension logic 430. Models 438 may be extended to include additional information about specific business data, and the additional information may then be used to support additional user interface functionality. With additional information available beside the core business data, models 438 may behave in a predetermined way when a specific event may occur. With this approach, without directly extending business objects 260 and 270, models 438, which may include the business data of business objects 260 and 270, may be extended to give effects of extending business object 260 and 270.

In one embodiment, model extension logic 430 may be provided in predefined breakout scenarios, and models 438 may be extended to provide additional user interface functionality based on the predefined breakout scenarios. In addition, because meta entities of adaptive models framework 150 may be meta data models, transformation models, or a combination of both types as explained above in detail with respect to FIG. 2, model-driven data binding, data mapping, and data transformation may also be extended or adapted by using model extension logic 430. Moreover, because meta entities of adaptive models framework 150 may be meta data models, meta process model, or a combination of both types as explained above in detail with respect to FIG. 2, business operations, such as business operations 310 and 330, may be extended or adapted by using model extension logic 430.

In another embodiment, model extension logic 430 may be provided as custom extension logics, and models 438 may be extended to provide additional user interface functionality based on custom extension logics, which may include logics that may not be in predefined breakout scenarios. For example, semantic messages, change notifications, and dynamic properties of business objects 260 and 270 may be overlaid by extending or adapting models 210 and 220 of adaptive models framework 150 by applying custom extension logics. Custom extension logics may be provided by any developers as the developers may see them necessary to provide any custom functionality in compliance with architectural contract definitions. Similarly, user interface control and behavior logics in components definitions 439 may be enhanced in adaptive way by applying UI extension logic 425. For example, UI extension logic 425 may add company Z's logo automatically to a user interface when the user interface may be designed and marked as a user interface for the company Z. UI extension logic may be also provided in predefined breakout scenario and/or custom extension logics.

After applying model extension logic 430 to models 438 and applying UI extension logic 425 to components definitions 439, models 438 and components definitions 439 may be compiled by compiler 440. Configuration 452 and composition 454 may then be generated by generator 445 and stored in runtime repository 450. Configuration 452 and composition 454 may collectively represent user interface design data 124. Configuration 452 may include meta-data that may define user interface components such as physical layout and fields. Composition 454 may include meta-data that may describe user interface control and behaviors, such as guided activities.

Pattern components 460 may use adaptation runtime 463 and generic client proxy (GCP) 466 to access business objects 166 in enterprise services repository 164. Configuration components 475 may be generated at runtime by pattern engine runtime 470 based on configuration 452 and composition 454. Pattern engine runtime 470 may be a Web Dynpro Runtime, which is commercially available from SAP AG, Walldorf, Germany. End user 110 may use a browser 480 to access user interface 122 presented by pattern engine runtime 470. Browser 480 may include a smart client and an internet browser, such as Internet Explore from Microsoft and Firefox from Mozilla.

Figure 5:
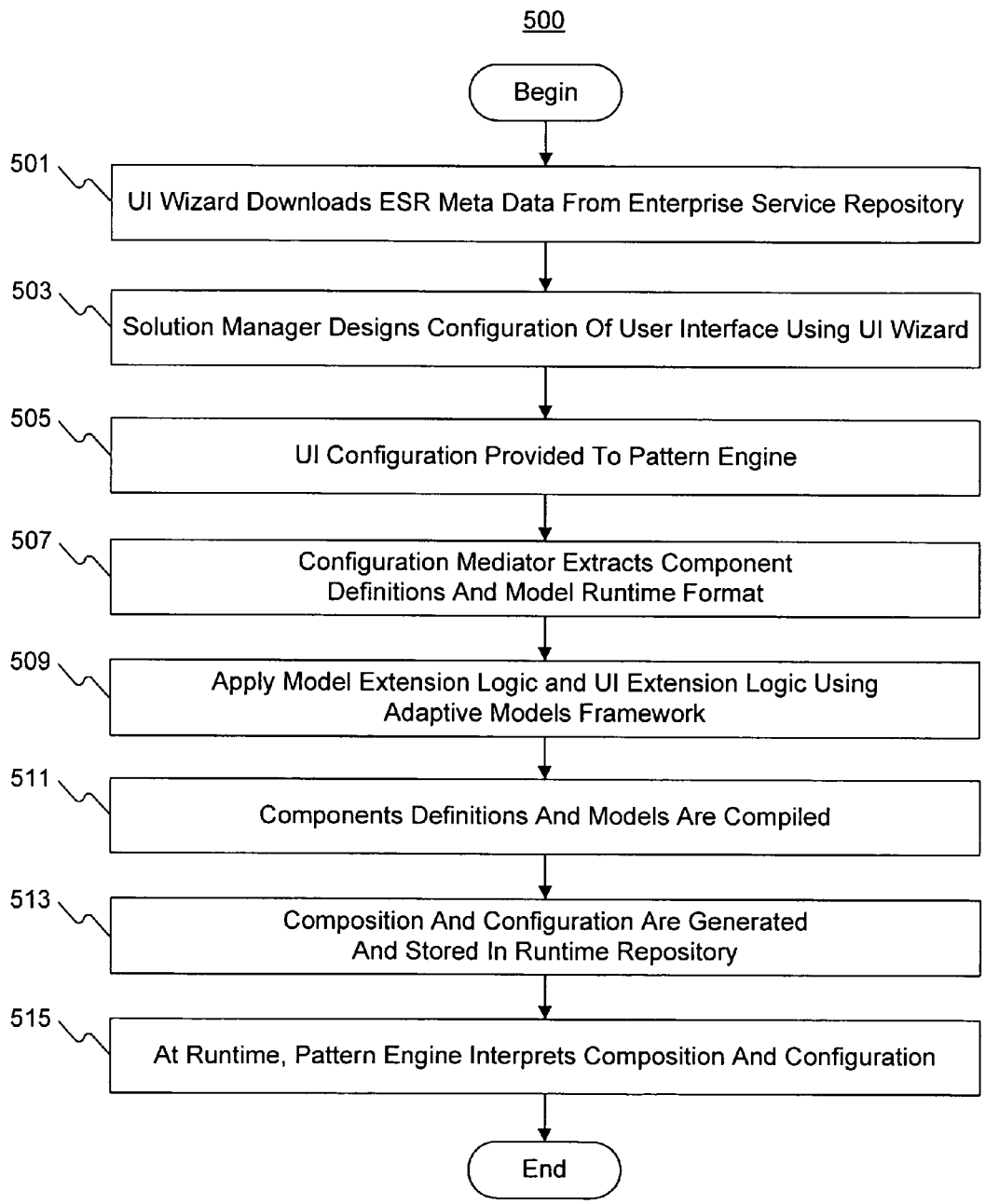
FIG. 5 is a flow diagram illustrating an exemplary user interface process consistent with the present invention.

FIG. 5 is a flow diagram illustrating an exemplary user interface process 500 consistent with the present invention. In exemplary embodiments, process 500 may use the exemplary pattern engine 120 depicted in detail with respect to FIG. 4. In one embodiment, UI Wizard 410 may download ESR meta data 414 from enterprise services repository 164 (stage 501). Solution manager 405 may design a complete configuration of user interface using UI Wizard 410 based on ESR meta data 414 and component definitions 416 (stage 503). Solution manager 405 may then provide the complete configuration of user interface to pattern engine 120 (stage 505). Configuration mediator 420 may extract models 438 in runtime format and components definitions 439 from the complete configuration of user interface (stage 507). UI extension logic 425 and model extension logic 430 may be applied using meta entities of adaptive models framework 150 to extend models 438 and components definitions 439 to provide additional functionality (stage 509). Models 438 and components definition 439 may then be compiled by compiler 440 (stage 511). Configuration 452 and composition 454 may be generated and, in exemplary embodiments, without an extra deployment stage, stored in runtime repository 450 (stage 513). Pattern engine 120 may interpret configuration 452 and composition 454 to generate a user interface at runtime (stage 515).

One of ordinary skill in the art will recognize that while FIG. 5 illustrates the above stages in a particular order, the order in which the stages are carried out is irrelevant. Systems consistent with the invention may carry out the stages in any order without departing from the scope of the present disclosure.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for generating a user interface, the system comprising:
   a business object containing first business data functionality;
   a model framework comprising a meta model including second business data functionality and a meta model node, the meta model node containing a data record having a unique key associating the meta model node with the business object containing the first business data functionality;
   a processing engine for generating the user interface, the processing engine:
      determining whether a predetermined event occurs;
      based on a result of the determination, adapting the meta model to include the first business data functionality of the business object using the unique key; and
      incorporating the adapted meta model into the user interface; and
   a processor for executing the processing engine.

2. The system of claim 1, wherein the meta model further comprises meta data including information describing the business data of the business object.

3. The system of claim 2, wherein the meta data facilitates data binding between the user interface and the business data, and facilitates data transformation of the business data for the user interface.

4. The system of claim 2, wherein the model framework further comprises a second meta model, and wherein the meta data facilitates data mapping between the business data of the meta model and business data of the second meta model.

5. The system of claim 1, wherein the model framework further includes:
   a model for implementing a user action on a meta model node.

6. A computer-implemented method for generating a user interface, the method comprising:
   receiving, by a processor associated with the computer, a business object containing first business data functionality;
   receiving, by the processor, a model framework comprising a meta model including second business data functionality and a meta model node, the meta model node containing a data record having a unique key associating the meta model node with the business object containing the first business data functionality; and
   generating, by the processor, the user interface based on the meta model, the generating including:
      determining whether a predetermined event occurs;
      based on a result of the determination, adapting the meta model to include the first business data functionality of the business object using the unique key; and
      incorporating the adapted meta model into the user interface.

7. The method of claim 6, wherein the meta model further comprises meta data including information describing the business data of the business object.

8. The method of claim 7, wherein the meta data facilitates data binding between the user interface and the business data, and facilitates data transformation of the business data for the user interface.

9. The method of claim 7, wherein the models framework further comprises a second meta model, and wherein the meta data facilitates data mapping between the business data of the meta model and business data of the second meta model.

10. The method of claim 6, wherein the models framework further includes:
    a model for implementing a user action on a meta model node.

11. A computer-readable storage medium storing instructions which, when executed by a computer, cause the computer to implement a method for generating a user interface, the method comprising:
    receiving a business object containing first business data functionality;
    receiving a model framework comprising a meta model including second business data functionality and a meta model node, the meta model node containing a data record having a unique key associating the meta model node with the business object containing the first business data functionality;
    and
    generating the user interface based on the meta model, the generating including:
       determining whether a predetermined event occurs;
       based on a result of the determination, adapting the meta model to include the first business data functionality of the business object using the unique key; and
       incorporating the adapted meta model into the user interface.

12. The computer-readable storage medium of claim 11, wherein the meta model further comprises meta data including information describing the business data of the business object.

13. The computer-readable storage medium of claim 12, wherein the meta data facilitates data binding between the user interface and the business data, and facilitates data transformation of the business data for the user interface.

14. The computer-readable storage medium of claim 12, wherein the models framework further comprises a second meta model, and wherein the meta data facilitates data mapping between the business data of the meta model and business data of the second meta model.

* * * * *